H. R. CURWEN.
COMBINED STEERING AND BRAKING MECHANISM.
APPLICATION FILED MAR. 24, 1913. RENEWED APR. 27, 1915.
1,148,291. Patented July 27, 1915.
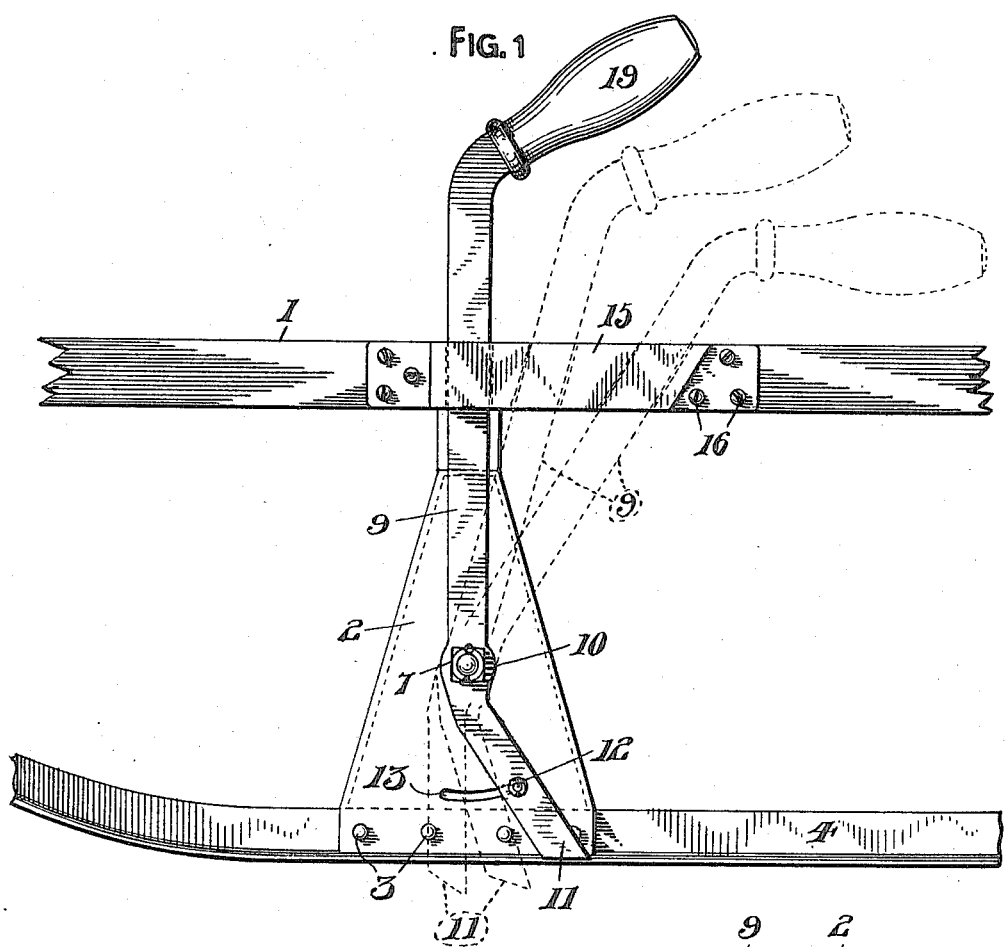
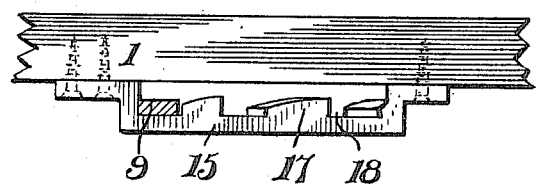
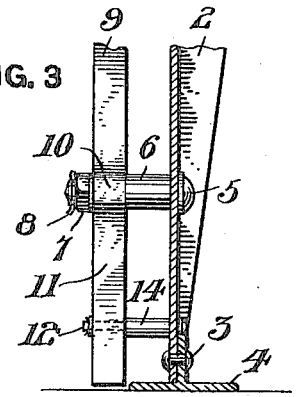
WITNESSES
INVENTOR
Henry R. Curwen
By Henry C. Evert
Att'y

UNITED STATES PATENT OFFICE.

HENRY ROBERT CURWEN, OF INGRAM, PENNSYLVANIA, ASSIGNOR TO SAFETY SPECIALTY COMPANY, OF PITTSBURGH, PENNSYLVANIA, A CORPORATION OF WEST VIRGINIA.

COMBINED STEERING AND BRAKING MECHANISM.

1,148,291.  Specification of Letters Patent.  Patented July 27, 1915.

Application filed March 24, 1913, Serial No. 756,438. Renewed April 27, 1915. Serial No. 24,350.

*To all whom it may concern:*

Be it known that I, HENRY ROBERT CURWEN, a citizen of the United States of America, residing at Ingram, in the county of Allegheny and State of Pennsylvania, have invented certain new and useful Improvements in Combined Steering and Braking Mechanism, of which the following is a specification, reference being had therein to the accompanying drawing.

This invention relates to a combined brake and steering mechanism for sled, slide, and other movable bodies, and the primary object of my invention is to furnish a sled with positive and reliable means, as hereinafter set forth, whereby the occupant of a sled can easily steer, guide and control the movement of the sled, without resorting to the use of the feet, consequently saving shoe leather and injury to the limb.

Another object of this invention is to provide a steering and braking mechanism that is applicable to various types of sleds, without materially increasing the weight of the same.

A further object of this invention is to provide a combined steering and braking mechanism that is inexpensive to manufacture, practically indestructible, easy to operate, and is highly efficient for the purposes for which it is intended.

With the above and other objects in view, the invention resides in a novel construction, combination and arrangement of parts to be hereinafter specifically described and then claimed.

Reference will now be had to the drawing, wherein:—

Figure 1 is a side elevation of the combined steering and braking mechanism. Fig. 2 is a plan of a clutch or lock forming part of the mechanism, and Fig. 3 is a front elevation of a portion of the mechanism.

Further describing my invention in detail with reference to the accompanying drawing wherein like numerals denote corresponding parts throughout:—1 denotes a portion of a sled, for instance the side frame or rail. Connected to the side frame of the sled is a depending angle bracket 2 that has the lower edge thereof riveted or otherwise secured, as at 3 to the runner 4 of the sled. The lower end of the bracket 2 is flared whereby it will be firmly held by the runner 4, and this bracket, adjacent to the runner 4, is provided with a bolt 5, a spacing sleeve 6, a nut 7 and a cotter pin 8.

9 denotes a brake lever having a boss or enlarged portion 10 that is pivotally mounted upon the bolt 5, between the sleeve 6 and the nut 7. The lower end of the brake lever 9 is angularly disposed, as at 11 and is provided with a pin 12 that extends into a segment shaped slot 13 provided therefor in the bracket 2. Surrounding the pin 12, between the lever 9 and the bracket 2 is a spacing sleeve 14 and said sleeve coöperates with said pin in steadying and bracing the lower angularly disposed end of the brake lever, thereby preventing said lever from spreading or becoming accidentally displaced, relatively to the runner 4, when said brake lever is placed in use.

The upper end of the brake lever 9 extends through a brake clutch or lock 15 that is in the form of a bracket secured by screws or other fastening means 16 to the outer side of the side frame 1. The inner side of the bracket is provided with beveled teeth 17 providing notches 18 that receive the brake lever 9 and hold said lever against accidental displacement. The upper end of the brake lever 9 is angularly disposed and provided with a handle 19.

In operation, the handle 19 at each side of the sled is held by the occupant thereof and either lever can be shifted to steer and guide the sled in a desired direction; the angularly disposed end of the lever on the left hand side of the sled being lowered when it is desired to steer the sled to the left. When it is desired to obtain a braking action, both levers 9 are shifted so that the lower ends thereof will engage in the surface over which the sled is traveling, under such circumstances retarding and eventually stopping the sled. It is during this braking action that the lower ends of the levers are braced by the pins 12. The occupant of the sled is facilitated in manipulating the levers 9 by the brake clutches, which permit of the operator positively setting the levers in an adjusted position, either when using the levers for braking purposes or for guiding the sled on a long curve.

On a bob sled or large coaster, a plurality of the levers can be used, and my invention is not limited to the position of the mechanism.

While in the drawing there is illustrated a preferred embodiment of the invention, it is to be understood that the structural elements are susceptible to such changes, as in the size, shape and manner of assemblage, as fall within the scope of the appended claims.

What I claim is:—

1. In a combined braking and steering mechanism, the combination with a sled, of brackets connecting the runners of said sled to the body thereof, levers pivotally supported by the outer sides of said brackets and spaced therefrom, pins carried by the lower ends of said levers and movably engaging in said brackets, and clutches carried by the sides of the sled for holding the levers in an adjusted position.

2. A combined braking and steering mechanism for sleds comprising brackets secured to the sides of the sled, levers pivotally connected to said brackets and projecting above the top of the sled, said levers having the lower portions thereof extending rearwardly at an inclination, and bracing means carried by the inclined portions of said levers and slidably connected to said brackets.

In testimony whereof I affix my signature in the presence of two witnesses.

HENRY ROBERT CURWEN.

Witnesses:
   Max Srolovitz,
   Katherine Errett.